April 29, 1941.   W. H. HAUPT ET AL   2,240,297
SEARCHLIGHT
Original Filed Dec. 18, 1939   2 Sheets-Sheet 2

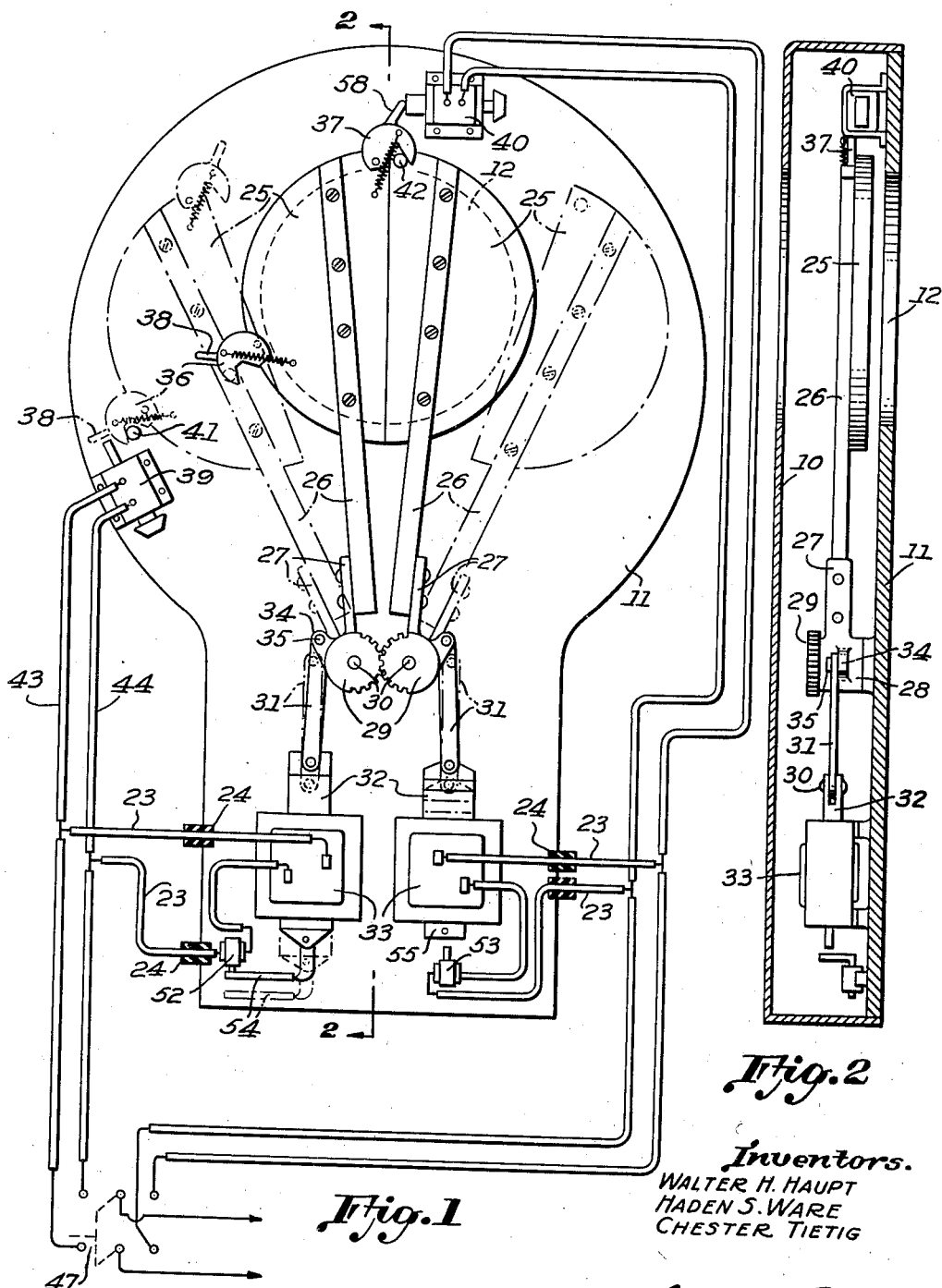

INVENTORS
WALTER H. HAUPT
HAYDEN S. WARE
CHESTER TIETIG
BY Chester Tietig
ATTORNEY.

Patented Apr. 29, 1941

2,240,297

UNITED STATES PATENT OFFICE 2,240,297

SEARCHLIGHT

Walter H. Haupt, Ludlow, Haden S. Ware, Fort Mitchell, and Chester Tietig, Covington, Ky., assignors to The Kelley-Koett Manufacturing Company, Incorporated, Covington, Ky., a corporation of Ohio Original application December 18, 1939, Serial No. 309,764. Divided and this application April 1, 1940, Serial No. 327,130

4 Claims. (Cl. 240—45)

This application is a division of our co-pending application, Serial No. 309,764, filed December 18, 1939, entitled Shutter for X-ray apparatus or the like which became Patent # 2,224,077 on December 3, 1940.

This invention relates to a searchlight which is especially adapted for defense against hostile aircraft. By the term "searchlight," we mean the combination of a military searchlight with a shutter such as we herein describe or a military searchlight with an ordinary shutter and our special electric circuit, or a military searchlight in combination with our special shutter and our special electric circuit, or its equivalent.

It is well known that the most effective way of fighting aircraft with anti-aircraft batteries is to locate the aircraft first by means which will not disclose the location of the battery. Such means are sound detectors or thermal detectors. The searchlights of the batteries are kept either unlighted or masked until the aircraft have come into range of the anti-aircraft artillery. Then the searchlights are quickly lighted or unmasked, usually after they have been first trained upon the aircraft by the aid of the detecting apparatus.

Among the objects of this invention are the provision of an improved combination of searchlight and shutter, or searchlight and electric circuit or searchlight, shutter and electric circuit. It is the object of the invention to provide not only the combination of these two or three elements but also auxiliary apparatus by reason of which the arc in the searchlight may be struck just before the operation of opening the shutter so that the entire succession of movements may be controlled by the operation of one electric switch, which is highly desirable from a military standpoint. By reason of its single switch control the mechanism is adapted to be actuated from a distance quite remote from the searchlight. Such a sequence of events initiated by a single action is believed to be a new result.

Another object is to provide a shutter in combination with the searchlight in which a short actuating impulse will be converted into a swift and comprehensive movement of the shutter.

In the drawings, Figure 1 is a plan view of the shutter and its associated mechanism and circuit, the cover of its case being removed.

Figure 2 is a cross section taken along the line 2—2 of Figure 1.

Figures 4, 5:
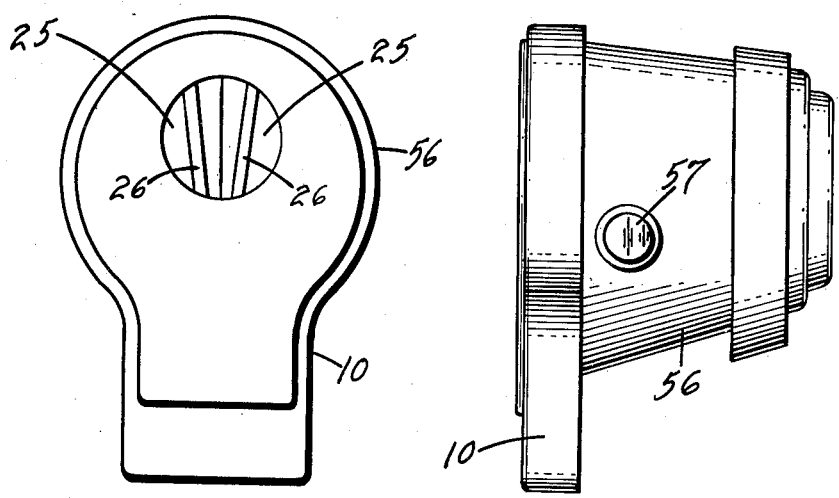
Figure 4 is a side view of a searchlight having our shutter attached to the front thereof.
Figure 5 is a front view of the searchlight. In this view the front of the shutter and its case obscure the view of the rest of the searchlight.

In the drawings, 10 is a generally keyhole shaped case housing the shutter and its associated mechanism. Its floor 11 is ray-proof except for a circular orifice 12 through which the beam is to be directed.

Insulated wire 23 from a source of electric power is conducted through an insulator 24 in the side of the rectangular portion of case 10, said wire conducting current for the actuation of electromagnets within the case. The entire assembly of case 10 and its enclosed mechanism is attached by means of bolts (not shown) or other fastenings to the front of the searchlight 56. Customarily, such a searchlight is a case containing a reflector, electrodes for the arc and a front lens or glass window. It is usually mounted by means of trunnions on an automobile truck bearing the generating equipment.

Referring now only to Figures 1 and 2, 25—25 are each semi-circular ray-obstructing elements of the shutter. They are each mounted upon a flat strut 26 which is in turn mounted upon a projection 27 of a casting 28 each of which supports a gear 29 which is adapted to rotate about a shaft 30. Each of these gears is in constant mesh with the other.

A pair of links 31 are pivotably attached to one side of castings 28 as shown in Figure 2. The rearward ends of said links being also pivotably mounted in the cores 32 of solenoids 33. The core of each of said solenoids is adapted to be moved simultaneously with its mate but not to be simultaneously actuated. The solenoids 33 are each in communication with the source of power through wire 23. Their links 31 are attached to the gears 29 by means of crank lugs 34 to which they are pivoted by pivots 35.

When the shutter halves 25 are open, as shown by their delineation in dotted line, the orifice 12 is freely open to the passage of the light beam. When the shutter halves are closed over orifice 12, they meet in overlapping relation as indicated by dotted line in Figure 1, so that the passage of substantially all light rays through them is prevented.

The electrical system is arranged as follows:—

36 and 37 are pivoted, spring-pressed latches attached to left hand shutter elements 25. Latch 36 is attached at the left side of the shutter element while latch 37 is attached at the tip. Each latch is provided with a projecting lug or trigger 38 with which the core of a solenoid may make contact. 39 is the solenoid controlling latch 36 and solenoid 40 controls latch 37. Latch 36 locks to a pin 41 set vertically into case 10, while latch 37 locks on a pin 42 set vertically into the tip of right hand shutter element 25.

Solenoid 39 and left hand solenoid 33 are connected in parallel by means of leads 43 and 44 and solenoid 40 and right hand solenoid 33 are likewise in parallel by means of leads 45 and 46. Each such pair of solenoids is therefore simultaneously actuable by the throwing of a double pole double throw switch 47. All four solenoids cannot, however, be actuated at the same time.

The operation therefore is that when switch 47 is closed to the left, solenoid 39 unlatches latch 36 by pushing on trigger 38 and simultaneously left hand solenoid 33 pushes on left hand lug 34, rotating both gears 29 to bring the shutter elements 25 together and at the same time, the searchlight, if same was lighted, is de-energized. At this time latch 37 automatically closes over pin 42 to hold the shutter closed. When the shutters are closed, switch 52 de-energizes the left-hand solenoid 33.

It will be observed that the two solenoids 33 are oppositely arranged. Therefore when switch 47 is closed to the right, the right hand solenoid 33 transmits a pull to right hand lug 34 and solenoid 40 pushes latch 37 open. Shutter elements 25 are then forced apart in unison until the limit of opening is reached when latch 36 closes over pin 41, thereby holding shutters 25 open.

Figure 3:
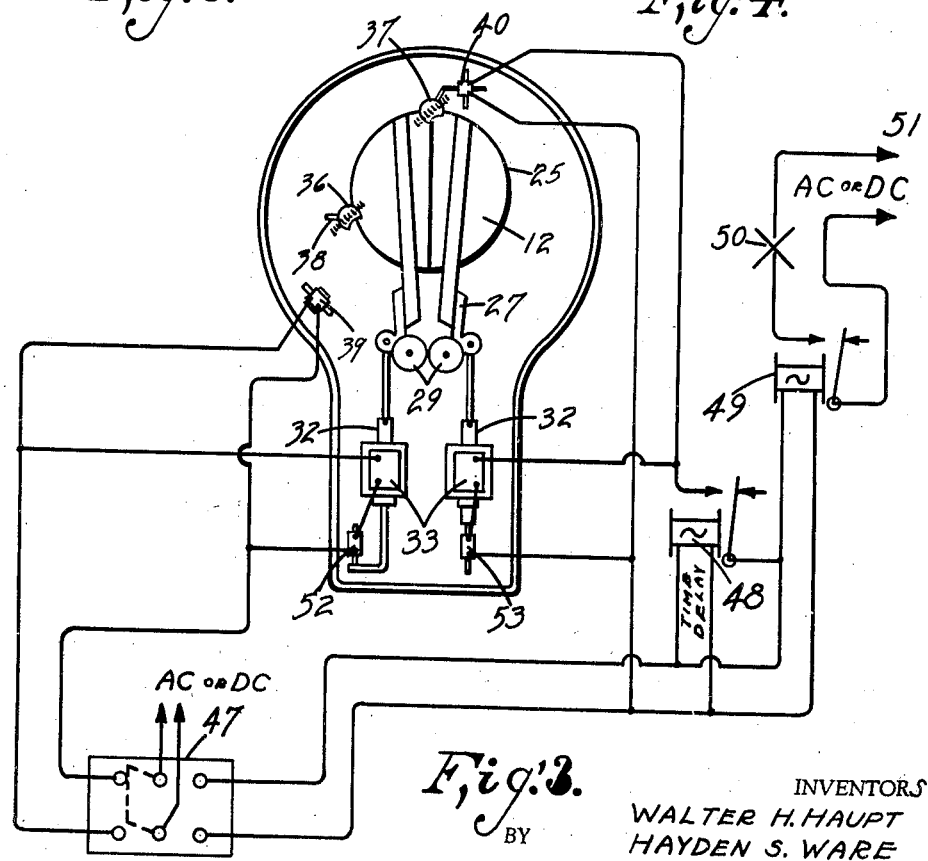
Figure 3 is a figure corresponding to Figure 1 but showing an electric circuit by which the searchlight can be energized just before the opening of the shutter.

Referring now to Figure 3, the arrangement there shown is essentially the same as shown in Figure 1 with the exception of a time delay relay 48 and a magnet switch 49 and the connection of the power mains through an arc 50, in case it is desired to energize the said arc by the operation of opening the shutter. To this end the time delay relay is connected in parallel with one of the shutter actuating solenoids 33 and in series with the power mains 51. The electrical consequence of such arrangement is that the closing of switch 47 by throwing it to the right in the arrangement shown in Figure 7 energizes the arc 50 a short time before the shutter opens by energizing the holding coil of magnet switch 49 and the holding coil of time delay relay 48. This enables the searchlight to be in full operation as soon as the shutter opens. Mains 51 and arc 50 constitute a main circuit control by magnet switch 49. The remainder of the electrical circuit, i. e., the shutter-operating and time delay operating circuit are here regarded as a subordinate circuit or sub-circuit.

As shown in Figures 1 and 3, it lies within the scope of the invention to provide a pair of limit switches 52 and 53 mounted upon the case below solenoids 33. The purpose of these switches is to turn off the current automatically and as soon as the ray obstructing elements 25 reach their completely open or completely shut positions. Both mechanical and electrical stress upon the mechanism is avoided by the use of such switches.

It will be noted that the lefthand or closing solenoid 33 is provided with a bent trigger 54 adapted to engage limit switch 52 at the end of the pushing motion of said solenoid and trigger. By such means the current to the pushing solenoid 33 is interrupted and its motion arrested. The limit switches are of the type in which the contacts are pressed into engagement by a spring. Suitable mercury switches are equivalent.

The lefthand limit switch 53 is adapted to be engaged by the end 55 of the solenoid core 32 at the end of its shutter opening motion, the result of which is to turn off the current on righthand solenoid 33.

In the appended claims, the term "searchlight" is used to include any light enclosed in a case and backed by a reflector so that a more or less parallel-edged beam of visible light is projected. Its source may be an arc, filament, vapor lamp, gas lamp or fluorescent tube.

We claim as our invention:

1. In combination, a searchlight, a shutter attached to said searchlight over the front thereof and an electric circuit connected both to said shutter and to said searchlight, said shutter comprising a case housing the shutter and having an opening for the passage therethrough of a beam of light, mechanism within said case comprising a pair of substantially flat ray-obstructing elements movable substantially parallel to the plane of said opening and together capable of substantially closing the latter against the passage of light therethrough, a strut for each of said ray-obstructing elements supporting the latter within said case, a pair of intermeshing gears pivoted within said case, each gear being substantially at and attached to that end of one of said struts which is furthest from said opening, a lug on each of said gears, remotely controlled means for rotating said gears, said means comprising a pair of solenoids, each of which is connected to one of said gears through one of said lugs whereby to bring together said ray-obstructing elements over said opening, one of said solenoids being arranged to exert its force to open said shutter and the other to close it, a pair of electro-magnetically controlled latches, a solenoid for each latch, one latch thereof being adapted to hold said ray-obstructing elements in open position and one latch thereof being adapted to hold said elements in shut position and an electric circuit comprising a main circuit including a power supply and a magnet switch adapted to close and open said main circuit, a sub-circuit including a time delay relay in parallel with said magnet switch and with each of said solenoids and a double-pole, double-throw switch whereby the actuation of said switch to close same will first energize the searchlight and then actuate said latches and said ray-obstructing elements in the order named.

2. In combination, a main circuit including a source of light for a searchlight, said circuit being provided with an independent current supply, a sub-circuit including a magnet switch arranged to close said main circuit, a time delay relay in parallel with said magnet switch, a pair of oppositely acting solenoids, said time delay relay being in parallel with each of said solenoids, a pair of shutters adapted to obscure the said source of light of said searchlight, both of said shutters being actuable by one of said solenoids to separate the shutters and both shutters being also actuable by the other of said solenoids to bring the shutters together and a double-pole, double-throw switch included in the sub-circuit whereby the shutters may be selectively operated to reveal or obscure the light source.

3. In combination, a main circuit including a source of light for a searchlight, said circuit being provided with an independent current supply, a sub-circuit including a magnet switch arranged to close said main circuit, a time delay relay in parallel with said magnet switch, a pair of oppositely acting solenoids, said time delay relay being in parallel with each of said solenoids, a pair of shutters adapted to obscure the said source of light of said searchlight, both of said shutters being actuable by one of said solenoids to separate the shutters and both shutters being also actuable by the other of said solenoids to bring the shutters together, two electromagnetically controlled latches attached to said case, each in parallel with said solenoids, one latch adapted to hold said shutters open when the latter are spread apart and one adapted to hold them closed when they are brought together, and a double-pole, double-throw switch included in the sub-circuit whereby the shutters may be selectively operated to reveal or obscure the light source.

4. In combination, a main circuit including a source of light for a searchlight, said circuit being provided with an independent current supply, a sub-circuit including a magnet switch arranged to close said main circuit, a time delay relay in parallel with said magnet switch, a pair of oppositely acting solenoids, said time delay relay being in parallel with each of said solenoids, a pair of shutters adapted to obscure the said source of light of said searchlight, both of said shutters being actuable by one of said solenoids to separate the shutters and both shutters being also actuable by the other of said solenoids to bring the shutters together, a pair of limit switches adapted to de-energize said solenoids when the shutters have reached their extreme positions, and a double-pole, double-throw switch included in the sub-circuit whereby the shutters may be selectively operated to reveal or obscure the light source.

WALTER H. HAUPT.
HADEN S. WARE.
CHESTER TIETIG.